United States Patent
Shan

(10) Patent No.: US 10,142,388 B2
(45) Date of Patent: Nov. 27, 2018

(54) METHOD AND DEVICE FOR TRANSMITTING MEDIA DATA

(71) Applicant: Huawei Device (Dongguan) Co., Ltd., Dongguan (CN)

(72) Inventor: Zhenwei Shan, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 210 days.

(21) Appl. No.: 15/107,084

(22) PCT Filed: Dec. 24, 2013

(86) PCT No.: PCT/CN2013/090340
§ 371 (c)(1),
(2) Date: Jun. 21, 2016

(87) PCT Pub. No.: WO2015/096038
PCT Pub. Date: Jul. 2, 2015

(65) Prior Publication Data
US 2016/0373505 A1   Dec. 22, 2016

(51) Int. Cl.
*H04W 72/04* (2009.01)
*H04L 29/06* (2006.01)
*H04L 12/64* (2006.01)

(52) U.S. Cl.
CPC ........ *H04L 65/602* (2013.01); *H04L 12/6418* (2013.01); *H04L 65/608* (2013.01)

(58) Field of Classification Search
CPC .. H04L 65/0602; H04L 65/608; H04W 80/04; H04W 72/04
See application file for complete search history.

(56) References Cited

U.S. PATENT DOCUMENTS 5,490,130 A       2/1996  Akagiri
2003/0231591 A1*  12/2003 Andonov .......... H04L 29/06027
                                              370/231
(Continued)

FOREIGN PATENT DOCUMENTS

CN       101438516 A    5/2009
CN       101507207 A    8/2009
(Continued)

OTHER PUBLICATIONS

"WiGig Display Extension Specification, Version 1.1", WiGig Wireless Gigabit Affiance, Jul. 2013, 123 pages.
(Continued)

*Primary Examiner* — Andrew Lee

(57) ABSTRACT

A method and a device for transmitting media data are provided, where a device sending the media data and a device receiving the media data are currently located in a same wireless network, and the method includes: acquiring, by the sending device, a frequency band of the wireless network; determining, by the sending device, whether the frequency band of the wireless network is a set frequency band; and if yes, setting a media data encoding mode of the sending device to non-compression, and sending, by the sending device, media data that is not compressed to the receiving device; or if the frequency band of the wireless network is not the set frequency band, setting a media data encoding mode of the sending device to compression, and sending, by the sending device, media data that is compressed to the receiving device. This solution reduces a delay caused by compression, reduces resources consumed by the sending device for data compression.

13 Claims, 11 Drawing Sheets

(56) References Cited

U.S. PATENT DOCUMENTS

| | | | |
|---|---|---|---|
| 2006/0133674 A1* | 6/2006 | Shibata | H04N 7/15 |
| | | | 382/232 |
| 2007/0201422 A1* | 8/2007 | Swarts | H04B 7/2684 |
| | | | 370/342 |
| 2010/0128679 A1 | 5/2010 | Kwon | |
| 2010/0138478 A1* | 6/2010 | Meng | H04N 5/44591 |
| | | | 709/203 |
| 2011/0138439 A1* | 6/2011 | Toba | H04N 5/45 |
| | | | 725/148 |
| 2012/0002681 A1 | 1/2012 | Inohiza et al. | |
| 2012/0057536 A1* | 3/2012 | Verma | H04W 72/0453 |
| | | | 370/329 |
| 2013/0031441 A1 | 1/2013 | Ngo et al. | |
| 2013/0136001 A1 | 5/2013 | Mese | |
| 2014/0029572 A1* | 1/2014 | Sayenko | H04W 36/0094 |
| | | | 370/331 |
| 2015/0326488 A1* | 11/2015 | Yousefi | H04N 7/183 |
| | | | 370/417 |
| 2017/0171507 A1* | 6/2017 | Kisanuki | H04N 7/0125 |

FOREIGN PATENT DOCUMENTS

| | | |
|---|---|---|
| CN | 101517995 A | 8/2009 |
| CN | 102349244 A | 2/2012 |
| CN | 103139197 A | 6/2013 |
| EP | 2025075 B1 | 8/2015 |
| JP | H06343167 A | 12/1994 |
| WO | 2012/110301 A1 | 8/2012 |

OTHER PUBLICATIONS

"Part 11: Wireless LAN Medium Access Control (MAC) and Physical Layer (PHY) Specifications—Amendment 3: Enhancements for Very High Throughput in the 60 GHz Band", IEEE P802.11ad/D8.0, May 2012, 664 pages.

"Advanced video coding for generic audiovisual services", ITU Recommendation ITU-T H.264, Apr. 2013, 732 pages.

"High efficiency video coding", ITU Recommendation ITU-T H.265, Apr. 2013, 317 pages.

"Wi-Fi Display Technical Specification, Version 1.1", 2WiFi Alliance, 2012, 151 pages.

"Specification impact of applying per band Compressed Mode", Samsung, 3GPP TSG RAN WG2#72-bis, Jan. 17-21, 2011, 2 pages, R2-110417.

"Applying Compressed Mode on per band basis", Samsung, Change Request, 3GPP TSG-RAN WG2#72-bis, Jan. 10, 2011, 12 pages, R2-110419.

"How to specify the per band Compressed Mode proposal", Samsung, 3GPP TSG RAN WG2#73, Feb. 14, 2011, 2 pages, R2-110909.

* cited by examiner

METHOD AND DEVICE FOR TRANSMITTING MEDIA DATA

CROSS REFERENCE TO RELATED APPLICATIONS

The present application claims priority under 35 U.S.C. § 365 to International Patent Application No. PCT/CN2013/090340 filed Dec. 24, 2013 which is incorporated herein by reference into the present disclosure as if fully set forth herein.

TECHNICAL FIELD

The present invention relates to the field of communications technologies, and in particular, to a method and a device for transmitting media data.

BACKGROUND

Wireless Gigabit is a faster short-range transmission technology, and supports multiple bandwidths. The technology is largely extended from conventional Wi-Fi, and therefore, it may switch to 802.11n. A frequency band corresponding to WiGig is 60 GHz, while a frequency band corresponding to 802.11n is 2.4 GHz. When a user terminal is relatively far away from an access point (AP, Access Point), the user terminal or the AP switches to a frequency band, for example, 2.4 GHz having a lower transmission speed and a longer transmission distance. When the user terminal is relatively near to the AP, the user terminal or the AP switches to the 60 GHz frequency band to obtain a higher connection rate.

The frequency bands are actually not specific frequencies, but frequency ranges, and may vary according to specifications of each country, for example, the 2.4 GHz frequency band refers to a frequency range around 2.4 GHz, and specifically, in China, U.S.A., and Europe, it refers to a frequency range of 2.400-2.4835 GHz, and in Japan, it refers to a frequency range of 2.471-2.497 GHz. A 5 GHz frequency band refers to a frequency range around 5 GHz; and in U.S.A., it refers to 5.85-5.925 GHz, and in Europe, it refers to 5.855-5.925 GHz. A 60 GHz frequency band generally refers to a free spectrum of 56 GHz to 66 GHz, and also varies according to specific situations of each country.

In the foregoing prior art, an encoding mode used to transmit media data is determined according to a standard protocol when the user terminal or the AP accesses a wireless network for the first time, and the encoding mode is no longer changed subsequently even if the user terminal or the AP switches to another wireless network. This method for determining an encoding mode lacks flexibility.

SUMMARY

Embodiments of the present invention provide a method and a device for transmitting media data, so that an encoding mode can be selected flexibly.

According to a first aspect, a method for transmitting media data is provided, where a device sending the media data and a device receiving the media data are currently located in a same wireless network, and the method includes:

acquiring, by the sending device, a frequency band of the wireless network; and determining, by the sending device, whether the frequency band of the wireless network meets a set condition;

and if yes, setting a media data encoding mode of the sending device to non-compression, and sending, by the sending device, media data that is not compressed to the receiving device; or if the frequency band of the wireless network does not meet the set condition, setting a media data encoding mode of the sending device to compression, and sending, by the sending device, media data that is compressed to the receiving device.

According to the first aspect, in a first possible implementation manner, before the acquiring, by the sending device, a frequency band of the wireless network, the method further includes:

using, by the sending device, one of wireless networks of multiple available frequency bands to perform media data transmission;

acquiring, by the sending device, information about transmission mode switching, and determining, according to the information about transmission mode switching, whether to switch the wireless network; and if a determining result is to switch the wireless network for transmission, switching the wireless network for performing data transmission, to a wireless network of another frequency band in the multiple available frequency bands; and the acquiring, by the sending device, a frequency band of the wireless network is specifically: acquiring, by the sending device, the frequency band of the wireless network that is obtained after the switching.

With reference to the first aspect or the first possible implementation manner, in a second possible implementation manner, if the sending device determines that the frequency band of the wireless network meets the set condition, the method further includes:

sending, by the sending device, a notification message, or adding a notification identifier to the media data that is not compressed, where the notification message or the notification identifier is used to notify the receiving device that the media data encoding mode of the sending device is set to non-compression.

With reference to the first aspect or the first possible implementation manner or the second possible implementation manner, in a third possible implementation manner, the set condition is that the frequency band is 5 GHz or 60 GHz.

With reference to the first possible implementation manner or the second possible implementation manner, in a fourth possible implementation manner, the set condition is that a center frequency of the frequency band of the wireless network after the switching is greater than a threshold.

With reference to the first aspect or any one of the first possible implementation manner to the fourth possible implementation manner, in a fifth possible implementation manner, the sending, by the sending device, media data that is not compressed to the receiving device specifically includes: sending, by the sending device, the media data that is not compressed to the receiving device by using the Real-Time Transport Protocol.

According to a second aspect, a method for transmitting data by an electronic device is provided, where the method includes:

performing data transmission by using one of multiple available frequency bands;

acquiring information about transmission mode switching;

determining, according to the acquired information, whether to switch the frequency band for transmission;

when the acquired information meets a requirement for switching the frequency band for transmission, switching the frequency band for performing data transmission, to another one of the multiple available frequency bands, and determining, according to the frequency band obtained after the switching, whether to compress data to be subsequently transmitted; and transmitting, to a receiving device according to a determining result, data that is compressed and that is to be subsequently transmitted or data that is not compressed and that is to be subsequently transmitted.

According to the second aspect, in a first possible implementation manner, the determining, according to the frequency band obtained after the switching, whether to compress data to be transmitted, includes:

if a center frequency of the frequency band that is obtained after the switching is lower than a center frequency of the frequency band that is obtained before the switching, determining to compress the data to be subsequently transmitted; or if a center frequency of the frequency band that is obtained after the switching is higher than a center frequency of the frequency band that is obtained before the switching, determining not to compress the data that is to be subsequently transmitted.

According to the first possible implementation manner of the second aspect, in a second possible implementation manner, the transmitting, to the receiving device, data that is not compressed and that is to be subsequently transmitted is specifically: transmitting, to the receiving device by using the Real-Time Transport Protocol, the data that is not compressed and that is to be subsequently transmitted.

According to the first possible implementation manner or the second possible implementation manner of the second aspect, in a third possible implementation manner, if it is determined not to compress the data to be subsequently transmitted, the method further includes:

sending, by a sending device, a notification message to the receiving device, or adding, by a sending device, a notification identifier to the data that is not compressed and that is to be subsequently transmitted, where the notification message or the notification identifier is used to notify the receiving device that a data encoding mode of the sending device is set to non-compression.

According to a third aspect, an embodiment of the present invention provides a method for transmitting data, where a device sending the data and a device receiving the data are currently located in a same wireless network, and the method includes:

receiving, by the receiving device, data sent by the sending device; and determining, by the receiving device, an encoding mode of the data, and if the encoding mode of the data is non-compression, directly decoding the media data.

In a first possible implementation manner of the third aspect of the embodiment of the present invention, the determining, by the receiving device, an encoding mode of the data, includes:

reading a notification identifier in the data, and determining the encoding mode of the data according to the notification identifier; or reading a notification message sent by the sending device, and determining the encoding mode of the data according to the notification message.

According to a fourth aspect, an embodiment of the present invention provides a sending device located in a same wireless network as that of a receiving device, where the sending device includes a transceiver and a processor, where:

the transceiver is configured to: when a media data encoding mode of the sending device is set to non-compression, send media data that is not compressed to the receiving device; or when a media data encoding mode of the sending device is set to compression, send media data that is compressed to the receiving device; and the processor is configured to: acquire a frequency band of the wireless network; determine whether the frequency band of the wireless network is a set frequency band; and if yes, set the media data encoding mode of the sending device to non-compression; or if the frequency band of the wireless network is not the set frequency band, set the media data encoding mode of the sending device to compression.

In a first possible implementation manner of the fourth aspect of the embodiment of the present invention, the transceiver is further configured to use one of wireless networks of multiple available frequency bands to perform media data transmission;

the processor is further configured to: before acquiring the frequency band of the wireless network, acquire information about transmission mode switching, and determine, according to the information about transmission mode switching, whether to switch the wireless network; and if a determining result is to switch the wireless network for transmission, switch the wireless network for performing data transmission, to a wireless network of another frequency band in the multiple available frequency bands; and the acquiring a frequency band of the wireless network is specifically: acquiring, by the sending device, the frequency band of the wireless network that is obtained after the switching.

With reference to the fourth aspect or the first possible implementation manner of the fourth aspect of the embodiment of the present invention, in a second possible implementation manner of the fourth aspect of the embodiment of the present invention, the transceiver is further configured to send a notification message to the receiving device when the processor determines that the frequency band of the wireless network is the set frequency band; or the processor is further configured to add, when it is determined that the frequency band of the wireless network is the set frequency band, a notification identifier to the media data that is not compressed, where the notification message or the notification identifier is used to notify the receiving device that the media data encoding mode of the sending device is set to non-compression.

With reference to the fourth aspect or the first possible implementation manner or the second possible implementation manner, in a third possible implementation manner, the set frequency band is 5 GHz or 60 GHz.

With reference to the fourth aspect or any one of the first possible implementation manner to the third possible implementation manner, in a fourth possible implementation manner, the sending media data that is not compressed to the receiving device specifically includes: sending the media data that is not compressed to the receiving device by using the Real-Time Transport Protocol.

According to a fifth aspect, a sending device is provided, where the sending device includes a transceiver and a processor, where:

the transceiver is configured to: perform data transmission by using one of multiple available frequency bands; and transmit, to a receiving device according to a determining result, data that is compressed and that is to be subsequently transmitted or data that is not compressed and that is to be subsequently transmitted; and the processor is configured to: acquire information about transmission mode switching; determine, according to the acquired information, whether to switch the frequency band for transmission; and when the acquired information meets a requirement for switching the frequency band for transmission, switch the frequency band for performing data transmission, to another one of the multiple available frequency bands, and determine, according to the frequency band obtained after the switching, whether to compress data that is to be subsequently transmitted.

According to the fifth aspect, in a first possible implementation manner, the determining, according to the frequency band obtained after the switching, whether to compress data to be transmitted, includes: if a center frequency of the frequency band that is obtained after the switching is lower than a center frequency of the frequency band that is obtained before the switching, determining to compress the data to be subsequently transmitted; or if a center frequency of the frequency band that is obtained after the switching is higher than a center frequency of the frequency band that is obtained before the switching, determining not to compress the data that is to be subsequently transmitted.

With reference to the first possible implementation manner of the fifth aspect, in a second possible implementation manner, the transceiver is specifically configured to transmit, to the receiving device by using the Real-Time Transport Protocol, the data that is not compressed and that is to be subsequently transmitted.

With reference to the first possible implementation manner or the second possible implementation manner, in a third possible implementation manner, the transceiver is further configured to send a notification message to the receiving device when the processor determines that a frequency band of the wireless network is a set frequency band; or the processor is further configured to add, when it is determined that a frequency band of the wireless network is a set frequency band, a notification identifier to the data that is not compressed and that is to be subsequently transmitted, where the notification message or the notification identifier is used to notify the receiving device that a data encoding mode of the sending device is set to non-compression.

According to a sixth aspect, a receiving device is provided, where the receiving device is located in a same wireless network as that of a sending device, where the receiving device includes a transceiver and a processor, where:

the transceiver is configured to receive data sent by the sending device; and the processor is configured to determine an encoding mode of the data, and if the encoding mode of the data is non-compression, directly decode the data.

According to the sixth aspect, in a first possible implementation manner, the determining, by the processor, an encoding mode of the data, specifically includes:

reading a notification identifier in the data, and determining the encoding mode of the data according to the notification identifier; or reading a notification message sent by the sending device, and determining the encoding mode of the data according to the notification message.

The embodiments of the present invention provide a method and a device for transmitting media data. A sending device does not compress, for a wireless network of a set frequency band, media data to be transmitted, but compresses media data for wireless networks of other frequency bands except the set frequency band. By using this solution, it is not necessary to compress all media data to be transmitted in all wireless networks; instead, compression or non-compression is selected according to a frequency band of a wireless network, and flexibility is higher.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
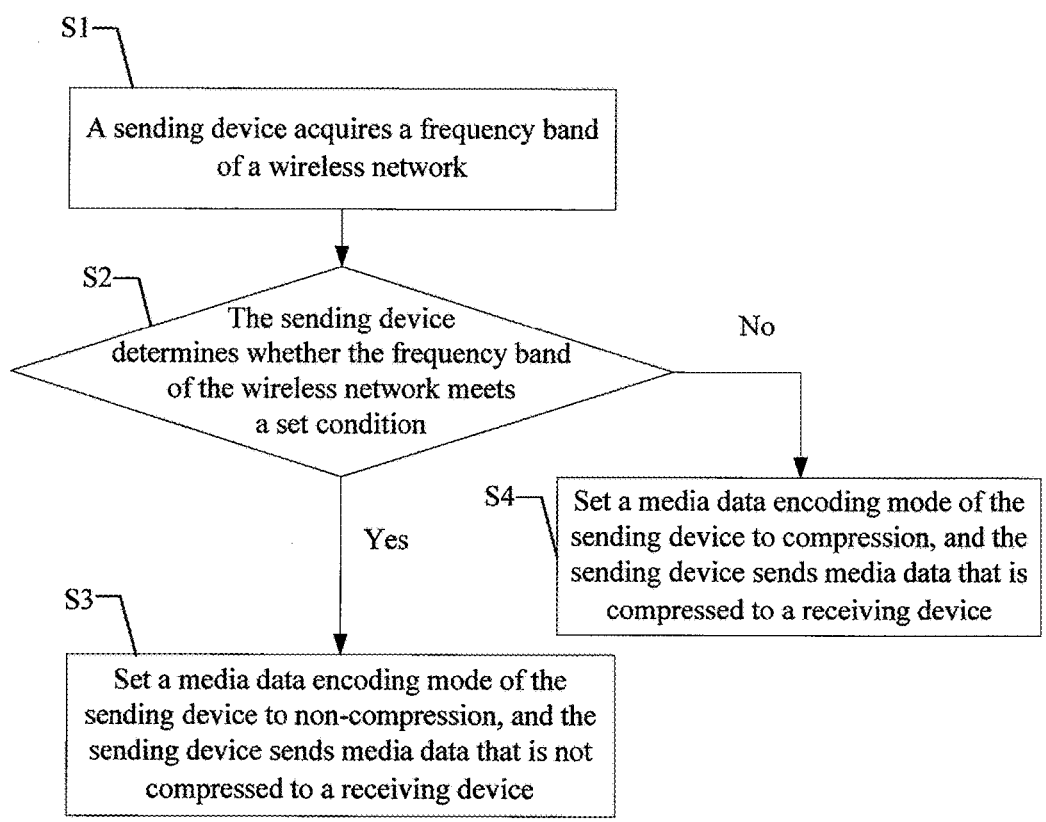
FIG. 1 is a flowchart of a method for transmitting media data according to Method Embodiment 1 of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

This embodiment of the present invention provides a method for transmitting media data, where the media data includes at least one of the following: text data, audio data, video data, and picture data. A device sending the media data and a device receiving the media data are currently located in a same wireless network.

This method is implemented under a precondition that the device sending the media data and the device receiving the media data are currently located in the same wireless network, where the wireless network includes a wireless local area network, or a 2G, 3G, 4G, or 5G network of a mobile phone network.

The following first uses a wireless local area network as an example for description. For a mobile phone network, reference may be made to subsequent embodiments.

The device sending the media data and the device receiving the media data may know, in many manners, that they are located in the same local area network. For example, the two devices may know, in a process of accessing the local area network, that they are located in the same local area network. Specifically, if the sending device and the receiving device construct the local area network in direct mode, some information such as device identifiers needs to be exchanged in a negotiation process. After the identifiers are exchanged completely, both the sending device and the receiving device may know that they are located in the same wireless local area network. If the sending device and the receiving device access the local area network by using an AP, the sending device or the receiving device may send a query message to the AP, or one of the two devices sends a query message to the other device by using the Simple Service Discovery Protocol (SSDP, Simple Service Discovery Protocol) or the Address Resolution Protocol (ARP, Address Resolution Protocol) to exchange local area network information of each other, and determines, according to an exchange result, whether the two devices are in the same wireless local area network.

The accessed wireless local area network may refer to a 2.4G wireless local area network, or a 5G wireless local area network, or a 60G wireless local area network, and is not limited to the wireless local area networks of the frequency bands that are listed currently.

It should also be noted that a trigger condition of the method is that the sending device accesses the wireless local area network. That "the sending device accesses the wireless local area network" mentioned herein and subsequently includes at least one of the following: the sending device accesses the wireless local area network for the first time, and the sending device switches from one wireless local area network to anther wireless local area network. That is, this manner is applicable to a case in which the sending device accesses the wireless local area network for the first time, or is applicable to only a case in which the sending device switches from one wireless local area network to another wireless local area network, or is applicable to a case in which the sending device accesses the wireless local area network for the first time and switches from the wireless local area network.

This method may be performed immediately after the sending device accesses the wireless local area network for the first time or switches to a new wireless local area network, or may be performed before media data is sent when the sending device needs to send the media data to the receiving device.

As shown in FIG. 1, the method includes:

Step S1: A sending device acquires a frequency band of a wireless network. It should be understood that the so-called wireless network may be a wireless local area network, or may be a 2G/3G/4G (LTE) network of a mobile phone network or a next-generation mobile communications network.

The device that performs the method, namely, the sending device (which may also be referred to as a source), may be a station (Station) or may be an access point (AP). A receiving device described subsequently may be an access point AP or may be a station (Station). For ease of description, the following uses a station A and a station B to separately represent two different stations. If the station A and the station B perform communication in direct mode, and the station A sends media data to the station B, the station A is the sending device and the station B is the receiving device; if the station A communicates with the station B by using an access point, and the station A sends media data to the station B, a path for transmitting the media data from the station A to the station B actually includes a segment from the station A to the access point and a segment from the access point to the station B. In the first segment, the station A is the sending device and the access point is the receiving device, but in the second segment, the access point is the sending device and the station B is the receiving device.

The access point may be a device such as a router, a gateway, or a mobile phone having an access point function, a portable computer, a tablet computer, a data card, a digital television, or a set top box, and the station may be a device such as a mobile phone, a tablet computer, a data card, or a digital television.

The frequency band of the wireless network acquired by the sending device in the foregoing step S1 may be specifically a frequency band obtained when the sending device accesses the network, or may be acquired by sending, after the sending device accesses the network, a request message to another device located in the same wireless network as that of the sending device. If the sending device and the receiving device perform communication in direct mode, the another device herein is the receiving device; if the sending device communicates with the receiving device by using an AP, an external device herein may also be the AP in addition to the receiving device.

A specific operation of acquiring a frequency band of a wireless network by the sending device in the foregoing step S1 may be: the sending device determines available frequency bands by sending a probe request to scan available frequency bands or by receiving a beacon frame (beacon frame) sent by the receiving device; then the sending device selects an available frequency band to set up a wireless connection to the receiving device; after the connection is set up successfully, the sending device knows the frequency band of the current wireless network.

Step S2: The sending device determines whether the frequency band of the wireless network meets a set condition, where the set condition may be specifically a set frequency band, but is not limited to the set frequency band.

Step S3: If the frequency band of the wireless network meets the set condition, the sending device sets a media data encoding mode of the sending device to non-compression, and the sending device sends media data that is not compressed to a receiving device.

The set condition in step S3 may be that the set frequency band is a 5 GHz or 60 GHz frequency band. With development of technologies, the set frequency band varies. A function of the set frequency band indicates that data is transmitted with higher efficiency in the frequency band and may be transmitted without compression.

When the media encoding mode of the sending device is set to non-compression, if media data is collected by the sending device in real time, the media data may be sent directly in a non-compression mode; if the sending device obtains compressed media data, the media data is decompressed, and decompressed data is encoded again and sent to the receiving device.

Step S4: If the frequency band of the wireless network does not meet the set condition, the sending device sets a media data encoding mode of the sending device to compression, and the sending device sends media data that is compressed to a receiving device.

The media data that is compressed may be: selecting an appropriate compression mode according to a hardware capability of the sending device, or selecting an appropriate compression mode according to existing compression efficiency, or selecting a particular compression mode, for example, H.264 or H.265, which is not limited to the compression modes that are listed currently.

In a method for transmitting media data according to this embodiment of the present invention, a sending device acquires a frequency band of a wireless network; the sending device determines whether the frequency band of the wireless network is a set frequency band, and if the frequency band of the wireless network is the set frequency band, sets a media data encoding mode of the sending device to non-compression; and the sending device sends media data that is not compressed to a receiving device. Because a transmission rate of the network of the set frequency band is very high, the sending device directly sends data that is not compressed to the receiving device, which reduces a delay caused by compression, reduces resources consumed by the sending device for data compression, and also reduces resources consumed by the receiving device for decompression.

Optionally, when the sending device switches from a wireless network of one available frequency band to a wireless network of another frequency band, before step S1, the method further includes:

Step S01: The sending device uses one of wireless networks of multiple available frequency bands to perform media data transmission.

Step S02: The sending device acquires information about transmission mode switching, and determines, according to the information about transmission mode switching, whether to switch the wireless network.

Step S03: If a determining result is to switch the wireless network for transmission, the sending device switch the wireless network for performing data transmission, to a wireless network of another frequency band in the multiple available frequency bands.

Therefore, that the sending device acquires the frequency band of the wireless network in step S1 is specifically: the sending device acquires the frequency band of the wireless network that is obtained after the switching.

Optionally, if the sending device determines that the frequency band of the wireless network meets the set condition, the method further includes:

Step S5: The sending device sends a notification message, or adds a notification identifier to the media data that is not compressed, where the notification message or the notification identifier is used to notify the receiving device that the media data encoding mode of the sending device is set to non-compression.

That the sending device sends a notification message may be sending the notification message before sending the media data, or may be sending the notification message after sending the media data.

Optionally, in the foregoing step S3, that the sending device sends media data that is not compressed to the receiving device specifically includes:

the sending device sends the media data that is not compressed to the receiving device by using the Real-Time Transport Protocol, where a protocol for sending the media data that is not compressed is not limited to the Real-Time Transport Protocol currently described, and may be other protocols.

Optionally, before the sending device acquires the information of the frequency band of the wireless network, the method further includes:

Step S6A: The sending device accesses the wireless network for the first time; or step S6B: The sending device switches from a previous wireless network to the current wireless network.

That the sending device accesses the wireless network for the first time in step S6A may be understood as that the sending device has never accessed the wireless network and currently accesses the wireless network for the first time.

Optionally, the set condition may be that the frequency band is 5 GHz or 60 GHz.

Optionally, the set condition is that a center frequency of the frequency band of the wireless network after the switching is greater than a threshold. The threshold is determined according to a maximum transmission rate that may be processed by hardware of the sending device or the receiving device.

Embodiment 2

Figure 2:
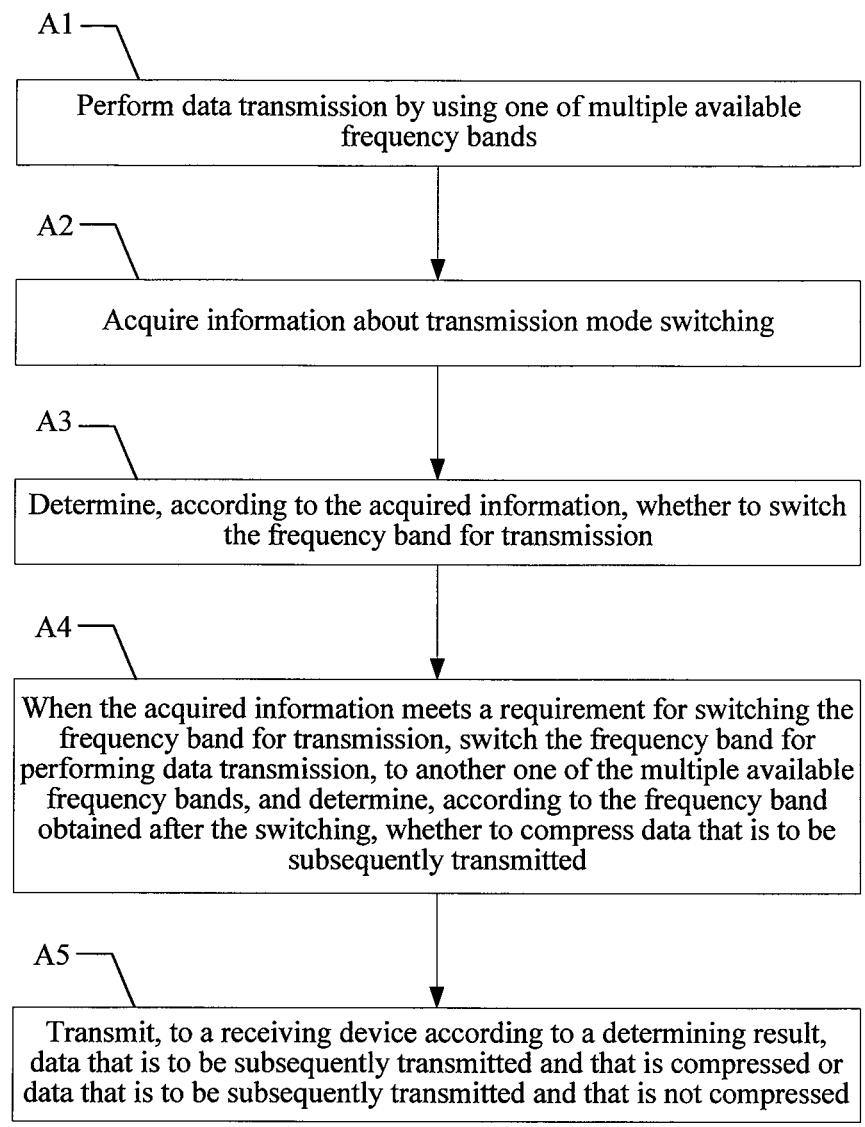
FIG. 2 is a flowchart of a method for transmitting data by an electronic device according to Method Embodiment 2 of the present invention.

The embodiment of the present invention further provides a method for transmitting data by an electronic device. As shown in FIG. 2, the method includes:

Step A1: Perform data transmission by using one of multiple available frequency bands.

A sending device may access a wireless network for the first time. When there are wireless networks of multiple available frequency bands, the sending device may select one available frequency band to perform data transmission. The data in step A1 may be media data or may be other data.

Step A2: Acquire information about transmission mode switching.

The acquired information about transmission mode switching may be specifically determining, according to a strength of a signal or a distance, or the like between the sending device and a receiving device, whether an available frequency band may be switched.

Step A3: Determine, according to the acquired information, whether to switch the frequency band for transmission.

Step A4: When the acquired information meets a requirement for switching the frequency band for transmission, switch the frequency band for performing data transmission, to another one of the multiple available frequency bands, and determine, according to the frequency band obtained after the switching, whether to compress data that is to be subsequently transmitted.

Step A5: Transmit, to a receiving device according to a determining result, data that is compressed and that is to be subsequently transmitted or data that is not compressed and that is to be subsequently transmitted.

Generally, an available wireless network of a higher frequency band has a higher transmission rate, and therefore, it may be considered that data is transmitted without compression. Likewise, an available wireless network of a lower frequency band has a lower transmission rate, and data may be transmitted after compression.

In a method for transmitting data by an electronic device according to this embodiment of the present invention, data transmission is performed by using one of multiple available frequency bands; when acquired information meets a requirement for switching the frequency band for transmission, the frequency band for performing data transmission is switched to another one of the multiple available frequency bands, and whether to compress data that is to be subsequently transmitted is determined according to the frequency band after the switching, which reduces resources consumed by a receiving device for decompression, so that media data transmission efficiency is higher.

Optionally, the determining, according to the frequency band obtained after the switching, whether to compress transmitted data in step A4, includes:

if a center frequency of the frequency band that is obtained after the switching is lower than a center frequency of the frequency band that is obtained before the switching, determining to compress the data to be subsequently transmitted; or if a center frequency of the frequency band that is obtained after the switching is higher than a center frequency of the frequency band that is obtained before the switching, determining not to compress the data that is to be subsequently transmitted.

Because the center frequency of the frequency band that is obtained after the switching is lower than the center frequency of the frequency band that is obtained before the switching, it may be considered that a data transmission rate in the wireless network after the switching is reduced, and is unsuitable for direct transmission without compression, and data may be transmitted after being compressed. Likewise, because the center frequency of the frequency band that is obtained after the switching is higher than the center frequency of the frequency band that is obtained before the switching, a data transmission rate in the wireless network after the switching is increased, and is suitable for direct transmission without compression.

Optionally, the transmitting, to the receiving device, data that is not compressed and that is to be subsequently transmitted is specifically: transmitting, to the receiving device by using the Real-Time Transport Protocol, the data that is not compressed and that is to be subsequently transmitted.

Optionally, if it is determined not to compress the data to be subsequently transmitted, the method further includes:

a sending device sends a notification message to the receiving device, or a sending device adds a notification identifier to the data that is not compressed and that is to be subsequently transmitted, where the notification message or the notification identifier is used to notify the receiving device that a data encoding mode of the sending device is set to non-compression.

Embodiment 3

Figure 3:
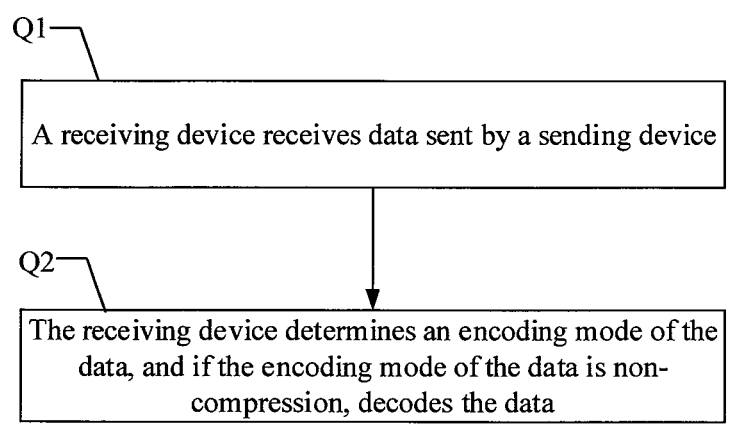
FIG. 3 is a flowchart of a method for transmitting media data according to Method Embodiment 3 of the present invention.

This embodiment of the present invention provides a method for transmitting data. As shown in FIG. 3, a device sending the data and a device receiving the data are currently located in a same wireless network, and the method includes:

Step Q1: A receiving device receives data sent by a sending device.

The receiving device may be an access point AP or may be a station (Station). The access point may be a device such as a router, a gateway, or a mobile phone having an access point function, a portable computer, a tablet computer, a data card, a digital television, or a set top box, and the station may be a device such as a mobile phone, a tablet computer, a data card, a data card, or a digital television.

Step Q2: The receiving device determines an encoding mode of the data, and if the encoding mode of the data is non-compression, directly decodes the data. For a specific operation of decoding the data, reference may be made to the prior art.

It should also be noted that, when the receiving device determines that the encoding mode of the data is compression in step Q2, the data is first decompressed and then decoded. Specific operations of decompression and decoding are not described in detail herein, and reference may be made to the prior art.

In a method for transmitting data according to this embodiment of the present invention, a receiving device determines an encoding mode of the data, and if the encoding mode of the data is non-compression, the data is directly decoded, which reduces resources consumed by the receiving device for decompression, so that data transmission efficiency is higher.

Optionally, in the foregoing step Q2, that the receiving device determines an encoding mode of the data includes:

reading a notification identifier in the data, and determining the encoding mode of the data according to the notification identifier; or reading a notification message sent by the sending device, and determining the encoding mode of the data according to the notification message.

When the read notification identifier in the data is null, or a numeric value is an agreed value, it may indicate that the encoding mode of the data is non-compression. Likewise, it may also be known that the encoding mode of the data is compression.

Embodiment 4

Figure 4:
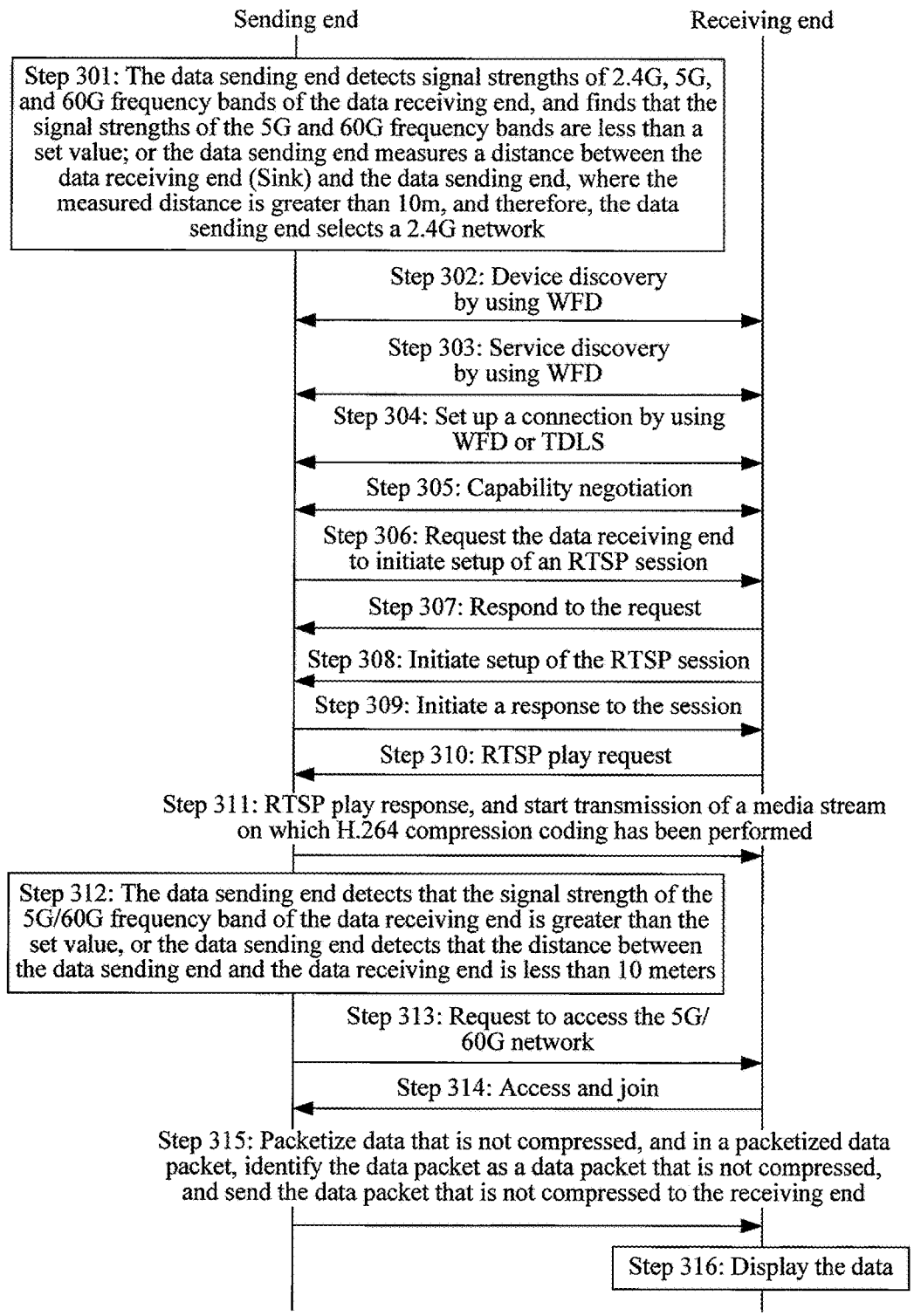
FIG. 4 is a flowchart of a method for transmitting media data according to Method Embodiment 4 of the present invention.

This embodiment of the present invention provides a method for transmitting media data, and is an exemplary implementation solution of Embodiments 1 and 2. In this embodiment, a sending device and a receiving device are in direct mode, and no AP is involved. The sending device detects a signal strength, or measures a distance between the sending device and the receiving device. Further, the sending device requests to access a 5G/60G network. A detailed description is as follows:

As shown in FIG. 4, the method includes:

Step 301: A sending device detects signal strengths of 2.4G, 5G, and 60G frequency bands of a receiving device, and finds that the signal strengths of the 5G and 60G frequency bands are less than a set value; or a sending device measures a distance between a receiving device (Sink) and the sending device, where the measured distance is greater than 10 m, and therefore, the sending device selects a 2.4G network. That the sending device selecting a 2.4G network may be accessing a 2.4G wireless local area network for the first time, or may be switching to a 2.4G wireless local area network according to a measurement in step 301.

If the signal strength in step 301 is indicated by a numeric value, a unit is dBm (full name: decibel relative to one milliwatt), indicating a quantity of decibels represented by one milliwatt. The following shows a correspondence between dBm and a signal bar: when a signal strength is −40 dBm to −50 dBm, it represents a highest signal strength value; when a signal strength is −50 dBm to −60 dBm, it is equivalent to a range of five signal bars; when a signal strength is −60 dBm to −70 dBm, it represents a range of four signal bars; when a signal strength is −70 dBm to −80 dBm, it represents three signal bars; when a signal strength is −80 dBm to −90 dBm, it represents a signal strength range of two bars; when a signal strength is −90 dBm to −99 dBm, it represents one signal bar. Herein the description is only for understanding, and is not intended to limit this embodiment of the present invention.

Step 302 and step 303: The sending device and the receiving device implement device and service discovery by using Wi-Fi Direct.

Step 304: The sending device and the receiving device set up a connection by using Wi-Fi Direct or Tunneled Direct Link Setup (TDLS, Tunneled Direct Link Setup).

Step 305: The sending device and the receiving device perform capability negotiation, for example, negotiate whether the receiving device supports H.264 decoding and H.265 decoding. In this embodiment, an example in which the receiving device supports the H.264 decoding is used for subsequent description.

The foregoing step 302 to step 305 are operations for setting up a physical layer connection and a data link layer connection between the sending device and the receiving device.

The following step 306 to step 311 are setting up an application layer session connection between the sending device and the receiving device, and include:

Step 306 and step 307: The sending device requests the receiving device to initiate setup of a Real Time Streaming Protocol (RTSP, Real Time Streaming Protocol) session.

Step 308 and step 309: The receiving device initiates setup of the RTSP session, which carries a wfd-presentation-url parameter, and the Source responds to the request.

Step 310 and step 311: The receiving device sends a playback request, and the sending device responds to the request, and starts transmission of a media stream on which H.264 compression coding has been performed. If the sending device acquires a 2.4G frequency band of the wireless local area network after performing the operation in step 301, the sending device determines that the frequency band of the wireless local area network is not a set frequency band, and sets a media data encoding mode of the sending device to compression, and the sending device sends media data that is compressed to the receiving device.

It is described in the following step 312 to step 314 that, when the sending device finds that the sending device needs to switch the network to a network of a set frequency band, a timely switching process specifically includes:

Step 312 to step 314: The sending device detects that the signal strength of the 5G/60G frequency band of the receiving device is greater than the set value, or the sending device detects that the distance between the sending device and the receiving device is less than 10 meters, the sending device requests to access the 5G/60G network, and the sending device accesses the network successfully.

Step 315: When the sending device accesses the 5G/60G network, the sending device set a media data encoding mode of the sending device to non-compression, packetize data that is not compressed, in a packetized data packet, identify the data packet as a data packet that is not compressed, and send the data packet that is not compressed to the receiving device.

The sending device may also first send a notification message before sending the media data, or send a notification message after sending the media data, where the notification message or the notification identifier is used to notify the receiving device that the media data encoding mode of the sending device is set to non-compression.

Step 316: The receiving device receives the data packet that is not compressed, determines that the media data encoding mode is non-compression, and decodes and displays the data.

It should be understood that, that the receiving device determines that the media data encoding mode is non-compression, may specifically include:

reading a notification identifier in the media data, and determining, according to the notification identifier, that the media data encoding mode is non-compression; or reading a notification message sent by the sending device, and determining, according to the notification message, that the media data encoding mode is non-compression.

If it is detected that a signal in the 5G/60G network of the receiving device is weak, or that the distance between the receiving device and the sending device is greater than 10 meters, the sending device switches to the 2.4G network, and performs H.264 compression coding, and transmission on remaining and subsequent data in a video RAM. For details, reference may be made to step 301 to step 311.

In a method for transmitting media data according to this embodiment of the present invention, a signal strength of a network of a set frequency band is measured, or a measured distance between a sending device and a receiving device (Sink) is acquired; when the measured signal strength of the network of the set frequency band is greater than a set value, or when the distance, obtained by the sending device, between the sending device and the receiving device is less than a set distance, the network of the set frequency band is selected for access; when the network of the set frequency band is accessed, data that is not compressed is packetized, and in a packetized data packet, the data packet is identified as a data packet that is not compressed; and the data packet that is not compressed is sent to the receiving device. Because a transmission rate of the network of the set frequency band is very high, the sending device directly sends data that is not compressed to the receiving device, which reduces a delay caused by compression, reduces resources consumed by the sending device for data compression, and also reduces resources consumed by the receiving device for decompression.

Embodiment 5

Figure 5:
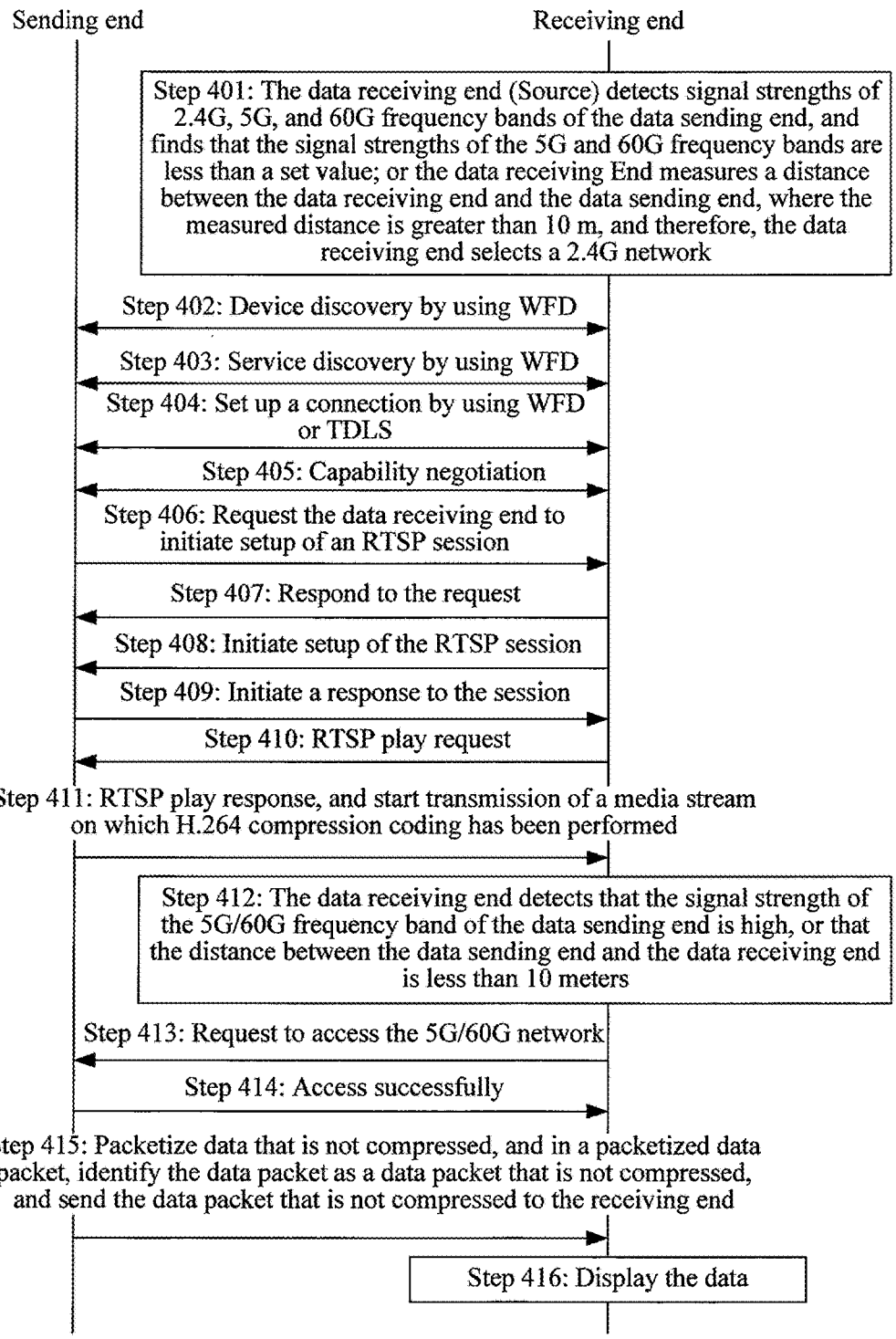
FIG. 5 is a flowchart of a method for transmitting media data according to Method Embodiment 5 of the present invention.

This embodiment of the present invention provides a method for transmitting media data, and is an exemplary implementation solution of Embodiments 1 and 2. In this embodiment, a sending device (Source) and a receiving device (Sink) are connected directly, and no AP is involved. The receiving device (Sink) detects a signal strength, or measures a distance between the sending device and the receiving device. Further, the receiving device (Sink) requests to access a 5G/60G network. A detailed description is as follows:

As shown in FIG. 5, the method includes:

Step 401: A receiving device (Source) detects signal strengths of 2.4G, 5G, and 60G frequency bands of a sending device, and finds that the signal strengths of the 5G and 60G frequency bands are less than a set value; or a receiving device measures a distance between the receiving device and a sending device, where the measured distance is greater than 10 m, and therefore, the receiving device selects a 2.4G network. That the sending device selects a 2.4G network may be accessing a 2.4G wireless local area network for the first time, or may be switching to a 2.4G wireless local area network according to a measurement in step 301.

Step 402 and step 403: The sending device and the receiving device implement device and service discovery by using Wi-Fi Direct (Wi-Fi Direct).

Step 404: The sending device and the receiving device set up a connection by using Wi-Fi Direct or Tunneled Direct Link Setup (TDLS, Tunneled Direct Link Setup).

Step 405: The sending device and the receiving device perform capability negotiation, for example, negotiate whether the receiving device supports H.264 decoding and H.265 decoding. In this embodiment, an example in which the receiving device supports the H.264 decoding is used for subsequent description.

The foregoing step 402 to step 405 are operations for setting up a physical layer connection and a data link layer connection between the sending device and the receiving device.

The following step 406 to step 411 are setting up an application layer session connection between the sending device and the receiving device, and include:

Step 406 and step 407: The sending device requests the receiving device to initiate setup of a Real Time Streaming Protocol (RTSP, Real Time Streaming Protocol) session.

Step 408 and step 409: The receiving device initiates setup of the RTSP session, which carries a wfd-presentation-url parameter, and the Source responds to the request.

Step 410 and step 411: The receiving device sends a playback request, and the sending device responds to the request, and starts transmission of a media stream on which H.264 compression coding has been performed. The sending device determines that the frequency band of the wireless local area network is not a set frequency band, and sets a media data encoding mode of the sending device to compression; the sending device sends media data that is compressed to the receiving device.

Step 412: The receiving device detects that the signal strength of the 5G/60G frequency band of the sending device is high, or that the distance between the sending device and the receiving device is less than 10 meters.

Step 413 and step 414: The receiving device requests to access the 5G/60G network, and receives an access success response sent by the sending device. In this case, the sink requests access, the source responds, and both the Sink and the Source access the 5G/60G network simultaneously.

Step 415: When the sending device accesses the 5G/60G network, the sending device sets a media data encoding mode of the sending device to non-compression, packetizes data that is not compressed, in a packetized data packet, identifies the data packet as a data packet that is not compressed, and sends the data packet that is not compressed to the receiving device.

Step 416: The receiving device receives the data packet that is not compressed, determines that the media data encoding mode is non-compression, and decodes and displays the data.

If the receiving device detects again that the distance between the sending device and the receiving device is greater than 10 meters, the receiving device switches to the 2.4G network; the sending device performs H.264 compression coding, and transmission on remaining and subsequent data in a video RAM. For details, reference may be made to step 401 to step 411.

In a method for transmitting media data according to this embodiment of the present invention, a receiving device measures a distance between a sending device and the receiving device, and when the distance is less than a set distance, selects to access a network of a set frequency band; when the network of the set frequency band is accessed, data that is not compressed is packetized, and in a packetized data packet, the data packet is identified as a data packet that is not compressed; and the data packet that is not compressed is sent to the receiving device. Because a transmission rate of the network of the set frequency band is very high, the sending device directly sends data that is not compressed to the receiving device, which reduces a delay caused by compression, reduces resources consumed by the sending device for data compression, and also reduces resources consumed by the receiving device for decompression.

Embodiment 6

Figure 6:
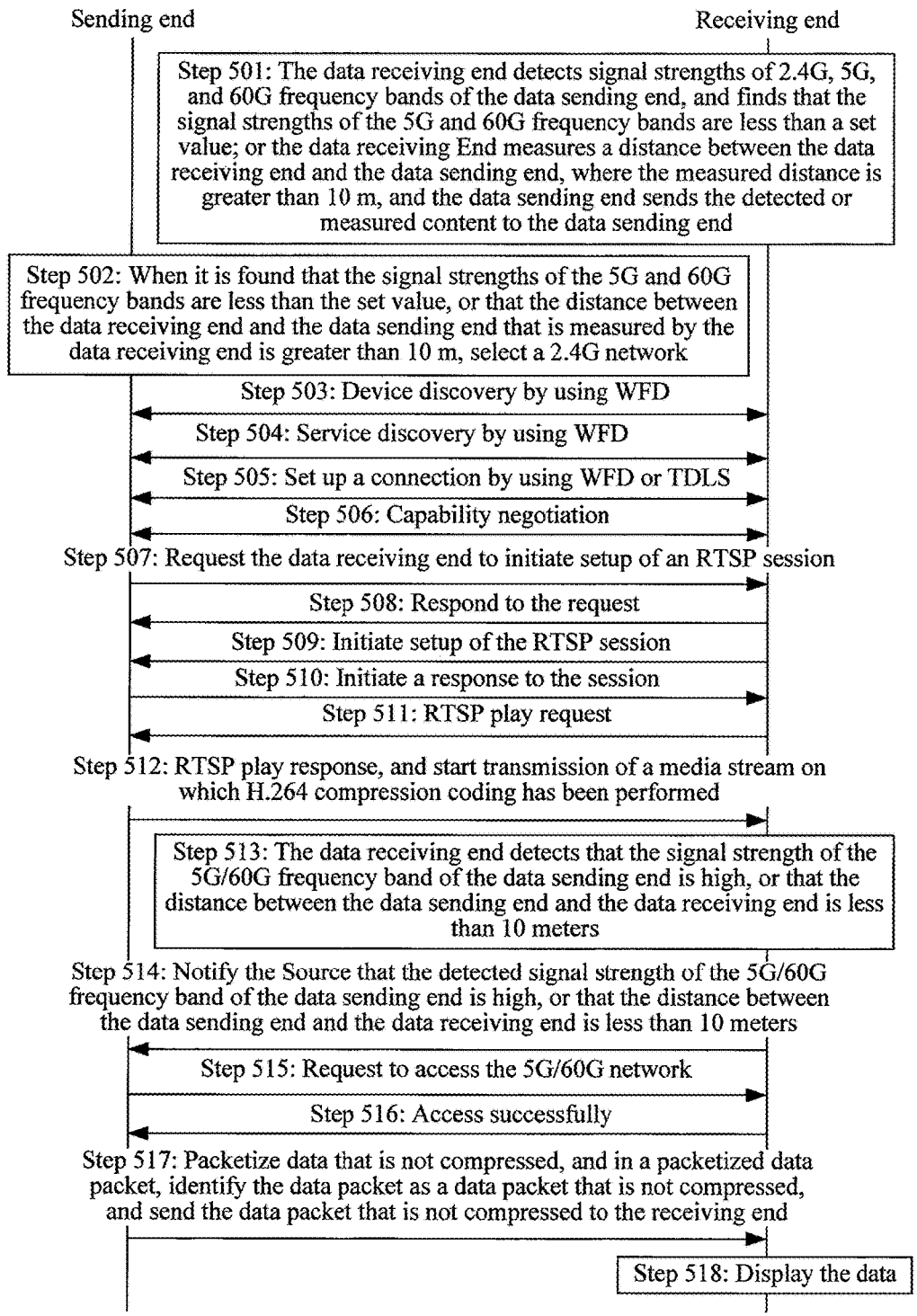
FIG. 6 is a flowchart of a method for transmitting media data according to Method Embodiment 6 of the present invention.

This embodiment of the present invention provides a method for transmitting media data, and is an exemplary implementation solution of Embodiments 1 and 2. In this embodiment, a receiving device (Sink) detects a signal strength, or measures a distance from the receiving device. Further, the sending device (Source) requests to access a 5G/60G network. A detailed description is as follows:

As shown in FIG. 6, the method includes:

Step 501: A receiving device detects signal strengths of 2.4G, 5G, and 60G frequency bands of a sending device, and finds that the signal strengths of the 5G and 60G frequency bands are less than a set value; or a receiving device measures a distance between the receiving device and a sending device, where the measured distance is greater than 10 m, and the receiving device sends the detected or measured content to the sending device.

Step 502: When it is found, according to the signal strengths of the 2.4G, 5G, and 60G frequency bands of the sending device that are detected by the receiving device in step 501, that the signal strengths of the 5G and 60G frequency bands are less than the set value, or that the distance between the receiving device and the sending device that is measured by the receiving device is greater than 10 m, the sending device selects a 2.4G network.

Subsequent step 503 to step 513 are correspondingly the same as step 402 to step 412 in the foregoing Embodiment 7, and are not described repeatedly herein.

Step 514: The receiving device notifies the Source by requesting SetParameter( ) Action from the sending device, that the distance between the sending device and the receiving device is less than 10 meters.

Step 515 and step 516: The sending device receives the request sent by the receiving device, requests to access the 5G/60G network, and accesses the network successfully.

Step 517: When accessing the 5G/60G network, the sending device packetizes data that is not compressed, in a packetized data packet, identifies the data packet as a data packet that is not compressed, and sends the data packet that is not compressed to the receiving device.

Step 518: The receiving device receives the data packet that is not compressed, and decodes and displays the data.

If the receiving device detects again that the distance between the receiving device and the sending device is greater than 10 meters, the receiving device notifies the sending device to switch to the 2.4G network; the sending device performs H.264 compression coding, and transmission on remaining and subsequent data in a video RAM. For details, reference may be made to step 501 to step 512.

In a method for transmitting media data according to this embodiment of the present invention, a distance between a sending device and a receiving device that is measured and sent by the receiving device is received; when the received distance between the sending device and the receiving device that is measured by the receiving device is less than a set distance, a network of a set frequency band is selected for access; when the network of the set frequency band is accessed, data that is not compressed is packetized, and in a packetized data packet, the data packet is identified as a data packet that is not compressed; and the data packet that is not compressed is sent to the receiving device. Because a transmission rate of the network of the set frequency band is very high, the sending device directly sends data that is not compressed to the receiving device, which reduces a delay caused by compression, reduces resources consumed by the sending device for data compression, and also reduces resources consumed by the receiving device for decompression.

Embodiment 7

Figure 7:
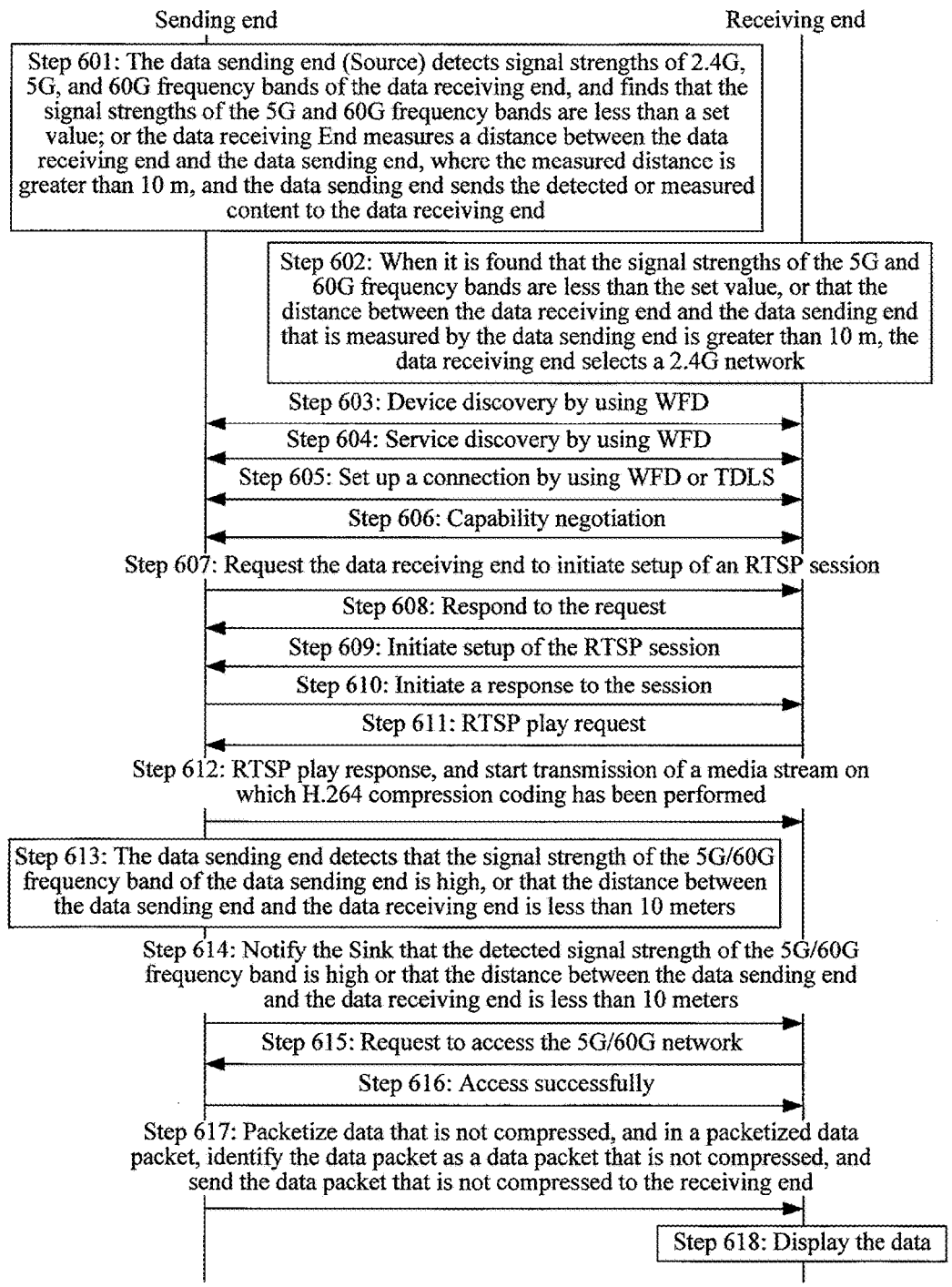
FIG. 7 is a flowchart of a method for transmitting media data according to Method Embodiment 7 of the present invention.

This embodiment of the present invention provides a method for transmitting media data, and is an exemplary implementation solution of Embodiments 1 and 2. In this embodiment, a sending device (source) detects a signal strength of a receiving device, or measures a distance between the sending device and a receiving device. Further, the receiving device (Sink) requests to access a 5G/60G network. A detailed description is as follows: As shown in FIG. 7, the method includes:

Step 601: A sending device (Source) detects signal strengths of 2.4G, 5G, and 60G frequency bands of a receiving device, and finds that the signal strengths of the 5G and 60G frequency bands are less than a set value; or a receiving device measures a distance between the receiving device and a sending device, where the measured distance is greater than 10 m, and the sending device sends the detected or measured content to the receiving device.

Step 602: When it is found, according to the signal strengths of the 2.4G, 5G, and 60G frequency bands of the receiving device that are detected by the sending device in step 601, that the signal strengths of the 5G and 60G frequency bands are less than the set value, or that the distance between the receiving device and the sending device that is measured by the sending device is greater than 10 m, the receiving device selects a 2.4G network.

Subsequent step 603 to step 612 are correspondingly the same as step 402 to step 411 in the foregoing Embodiment 5, and are not described repeatedly herein.

Step 613: The sending device detects that the signal strength of the 5G/60G frequency band of the receiving device is greater than the set value, or the sending device detects that the distance between the sending device and the receiving device is less than 10 meters.

Step 614: The sending device notifies the Sink by requesting SetParameter( ) Action from the receiving device, that the distance between the Source and the Sink is less than 10 meters or that the signal strength of the 5G/60G frequency band is high.

Steps 615 and 616: The receiving device requests to access the 5G/60G network, and the receiving device accesses the network successfully.

Step 617: When accessing the 5G/60G network, the sending device packetizes data that is not compressed, in a packetized data packet, identifies the data packet as a data packet that is not compressed, and sends the data packet that is not compressed to the receiving device.

Step 618: The receiving device receives the data packet that is not compressed, and decodes and displays the data.

If it is detected that the signal strength of the 5G/60G frequency band of the receiving device is low, or that the distance between the receiving device and the sending device is greater than 10 meters, the receiving device switches to the 2.4G network; the sending device performs H.264 compression coding, and transmission on remaining and subsequent data in a video RAM. For details, reference may be made to step 601 to step 612.

In a method for transmitting media data according to this embodiment of the present invention, a signal strength of a network of a set frequency band is measured, or a measured distance between a sending device and a receiving device (Sink) is acquired; when the measured signal strength of the network of the set frequency band is greater than a set value, or when the distance, obtained by the sending device, between the sending device and the receiving device is less than a set distance, the network of the set frequency band is selected for access; when the network of the set frequency band is accessed, data that is not compressed is packetized, and in a packetized data packet, the data packet is identified as a data packet that is not compressed; and the data packet that is not compressed is sent to the receiving device. Because a transmission rate of the network of the set frequency band is very high, the sending device directly sends data that is not compressed to the receiving device, which reduces a delay caused by compression, reduces resources consumed by the sending device for data compression, and also reduces resources consumed by the receiving device for decompression.

Embodiment 8

Figure 8:
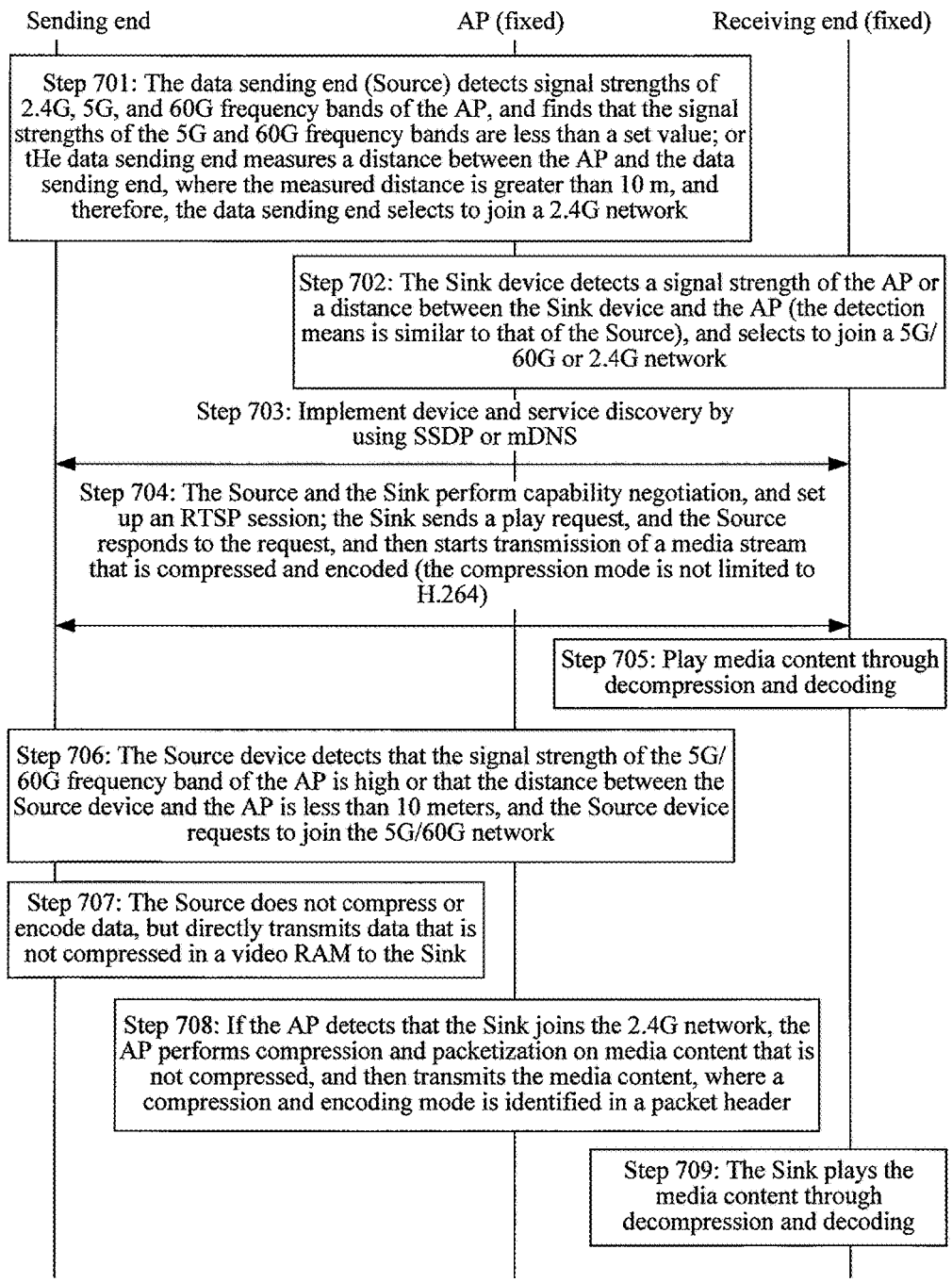
FIG. 8 is a flowchart of a method for transmitting media data according to Method Embodiment 8 of the present invention.

This embodiment of the present invention provides a method for transmitting media data. An implementation process of the method includes an AP, and locations of a receiving device (Sink) and the AP are fixed in the solution, but a sending device (Source) is mobile. A detailed description is as follows: As shown in FIG. 8, the method includes:

Step 701: A sending device (Source) detects signal strengths of 2.4G, 5G, and 60G frequency bands of an AP, and finds that the signal strengths of the 5G and 60G frequency bands are less than a set value; or a sending device measures a distance between an AP and the sending device, where the measured distance is greater than 10 m, and therefore, the sending device selects to access a 2.4G network.

Step 702: A Sink device detects a signal strength of the AP or a distance between the Sink device and the AP (the detection means is similar to that of the Source), and selects to access a 5G/60G or 2.4G network.

Step 703: Implement device and service discovery by using SSDP or mDNS.

Step 704: The Source and the Sink perform capability negotiation, and set up an RTSP session; the Sink sends a playback request, and the Source responds to the request, and then starts transmission of a media stream that is compressed and encoded (the compression mode is not limited to H.264).

Step 705: The Sink plays media content by means of decompression and decoding.

Step 706: The Source device detects that the signal strength of the 5G/60G frequency band of the AP is high or that the distance between the Source device and the AP is less than 10 meters, and the Source device requests to access the 5G/60G network.

Step 707: The Source does not compress or encode data, but directly transmits data that is not compressed (RTP packetization may be performed on the data that is not compressed, and in an identifier bit of a packet header, the packetized data may be identified as data that is not compressed) in a video RAM to the Sink.

Step 708: If the AP detects that the Sink accesses the 2.4G network, the AP performs compression and packetization on media content that is not compressed, and then transmits the media content, where a compression and encoding mode is identified in a packet header.

Step 709: The Sink plays the media content by means of decompression and decoding.

Step 710: If the Source device detects that the signal strength of the 5G/60G frequency band of the AP is low, or that the distance is greater than 10 meters, the Source device switches to the 2.4G network, and performs H.264 compression coding, and transmission on remaining and subsequent data in the video RAM. For details, reference may be made to step 701 to step 706.

In a method for transmitting media data according to this embodiment of the present invention, when a Source accesses a network of a set frequency band, the Source packetizes data that is not compressed, identifies, in a packetized data packet, the data packet as a data packet that is not compressed, and sends the data packet that is not compressed to an AP, and then the AP performs compression and forwards the data packet to a Sink. Because a transmission rate of the network of the set frequency band is very high, the sending device directly sends data that is not compressed to the receiving device, which reduces a delay caused by compression, reduces resources consumed by the sending device for data compression, and also reduces resources consumed by the receiving device for decompression.

Embodiment 9

Figure 9:
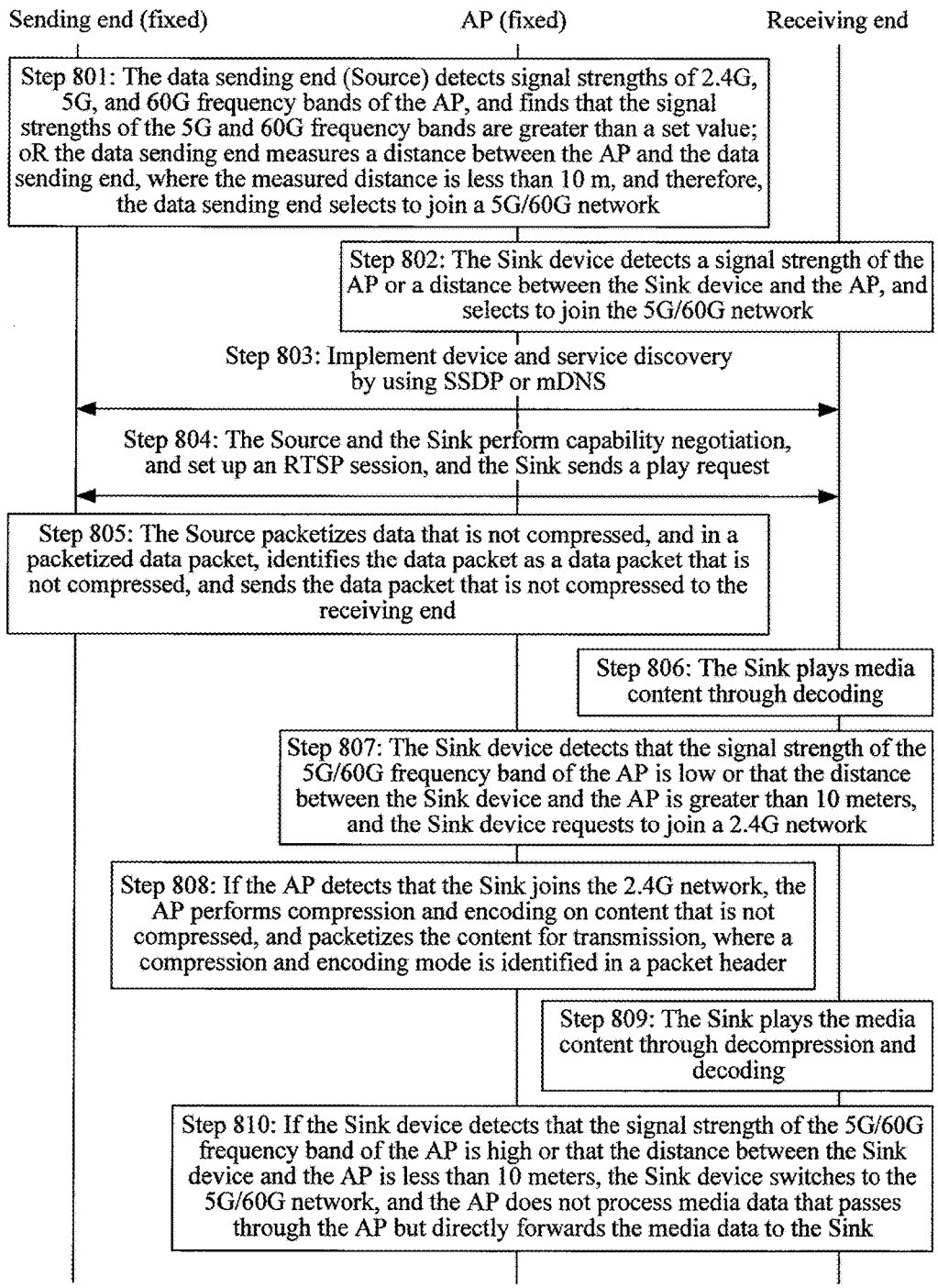
FIG. 9 is a flowchart of a method for transmitting media data according to Method Embodiment 9 of the present invention.

This embodiment of the present invention provides a method for transmitting media data. An implementation process of the method includes an AP, and locations of a sending device (Source) and the AP are fixed in the solution, but a receiving device (Sink) is mobile. A detailed description is as follows: As shown in FIG. 9, the method includes:

Step 801: A sending device (Source) detects signal strengths of 2.4G, 5G, and 60G frequency bands of an AP, and finds that the signal strengths of the 5G and 60G frequency bands are greater than a set value; or a sending device measures a distance between an AP and the sending device, where the measured distance is less than 10 m, and therefore, the sending device selects to access a 5G/60G network.

Step 802: A Sink device detects a signal strength of the AP or a distance between the Sink device and the AP (the detection means is similar to that of the Source), and selects to access the 5G/60G network.

Step 803: Implement device and service discovery by using SSDP or mDNS.

Step 804: The Source and the Sink perform capability negotiation, and set up an RTSP session, and the Sink sends a playback request.

Step 805: The Source packetizes data that is not compressed, in a packetized data packet, identifies the data packet as a data packet that is not compressed, and sends the data packet that is not compressed to the receiving device.

Step 806: The Sink plays media content by means of decoding.

Step 807: The Sink device detects that the signal strength of the 5G/60G frequency band of the AP is low or that the distance between the Sink device and the AP is greater than 10 meters, and the Sink device requests to access a 2.4G network.

Step 808: If the AP detects that the Sink accesses the 2.4G network, the AP performs compression coding on content that is not compressed, and packetizes the content for transmission, where a compression and encoding mode is identified in a packet header.

Step 809: The Sink plays the media content by means of decompression and decoding.

Step 810: If the Sink device detects that the signal strength of the 5G/60G frequency band of the AP is high or that the distance between the Sink device and the AP is less than 10 meters, the Sink device switches to the 5G/60G network, and the AP does not process media data that passes through the AP but directly forwards the media data to the Sink.

In a method for transmitting media data according to this embodiment of the present invention, when a Source accesses a network of a set frequency band, the Source packetizes data that is not compressed, identifies, in a packetized data packet, the data packet as a data packet that is not compressed, and sends the data packet that is not compressed to a Sink. Because a transmission rate of the network of the set frequency band is very high, the sending device directly sends data that is not compressed to the receiving device, which reduces a delay caused by compression, reduces resources consumed by the sending device for data compression, and also reduces resources consumed by the receiving device for decompression.

Embodiment 10

Figure 10:
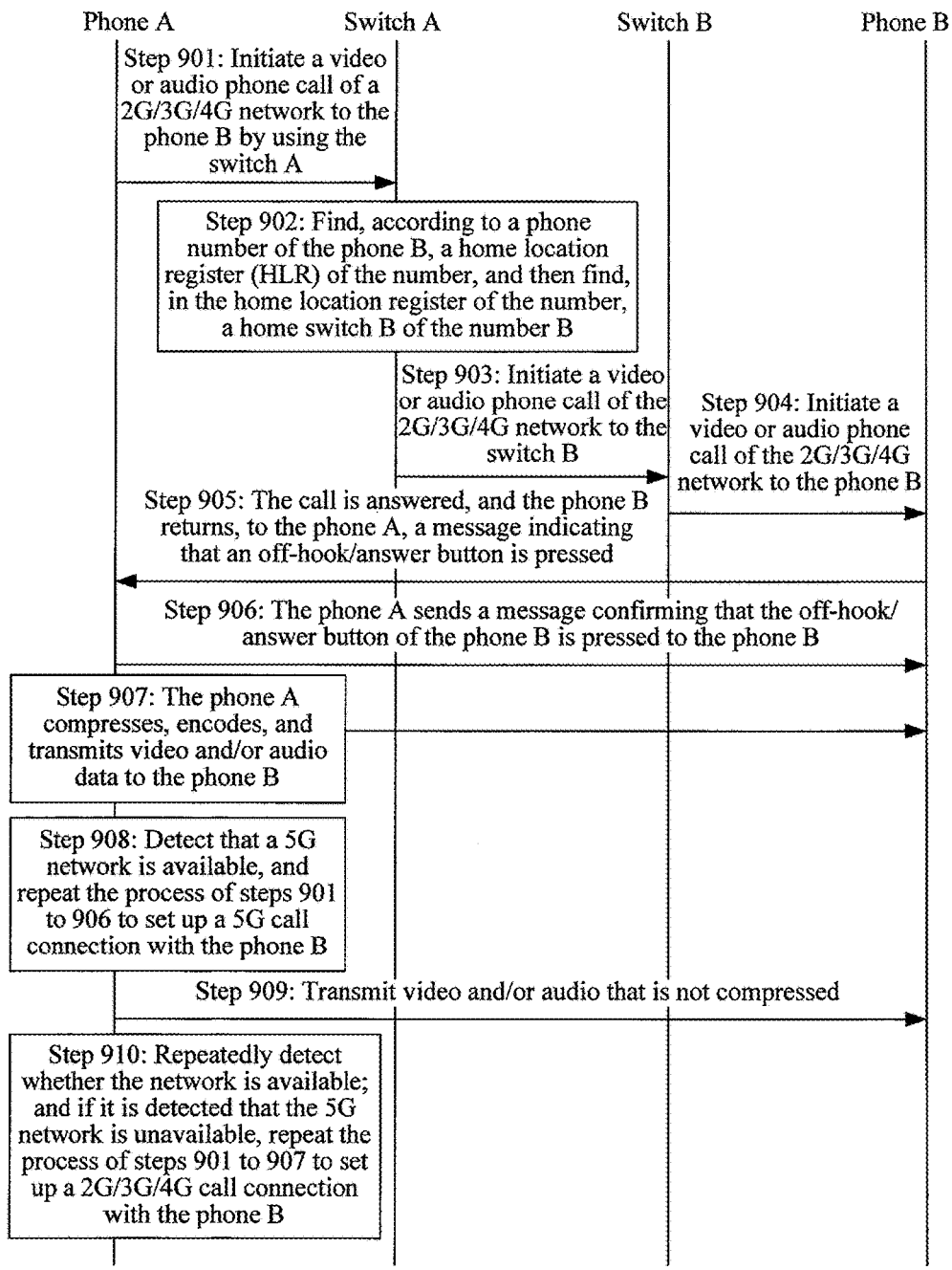
FIG. 10 is a flowchart of a method for transmitting media data according to Method Embodiment 10 of the present invention.

This embodiment of the present invention provides a method for transmitting data. The method may be used to perform non-compression processing on data that needs to be transmitted in a mobile communications network during switching from a 2G/3G/4G network to a 5G network, thereby improving data transmission efficiency. A specific operation, as shown in FIG. 10, includes:

Step 901: A phone A initiates a video or audio phone call of a 2G/3G/4G network to a phone B by using a switch A.

Step 902: The switch A finds, according to a phone number of the phone B, a home location register (HLR) of the number, and then finds, in the home location register of the number, a home location switch B of the number B.

Step 903: The switch A initiates a video or audio phone call of the 2G/3G/4G network to the switch B.

Step 904: The switch B initiates a video or audio phone call of the 2G/3G/4G network to the phone B.

Step 905: The call is answered, and the phone B returns, to the phone A, a message indicating that an off-hook/answer button is pressed.

Step 906: The phone A sends, to the phone B, a message acknowledging that the message indicating that the off-hook/answer button of the phone B is pressed is received.

Step 907: The phone A compresses, encodes, and transmits video and/or audio data to the phone B.

Step 908: The phone A detects that a 5G network is available, and repeats the process of steps 901 to 906 to set up a 5G call connection to the phone B.

Step 909: Transmit video and/or audio that is not compressed.

Step 910: Repeatedly detect whether the network is available; and if it is detected that the 5G network is unavailable, repeat the process of steps 901 to 907 to set up a 2G/3G/4G call connection to the phone B, and transmit video and/or audio data that is compressed and encoded.

In a method for transmitting data according to this embodiment of the present invention, when a phone A accesses a 5G network, data that is not compressed is packetized. Because a transmission rate of the 5G network is very high, a sending device directly sends data that is not compressed to a receiving device, which reduces a delay caused by compression, reduces resources consumed by the sending device for data compression, and also reduces resources consumed by the receiving device for decompression.

Embodiment 11

Figure 11:
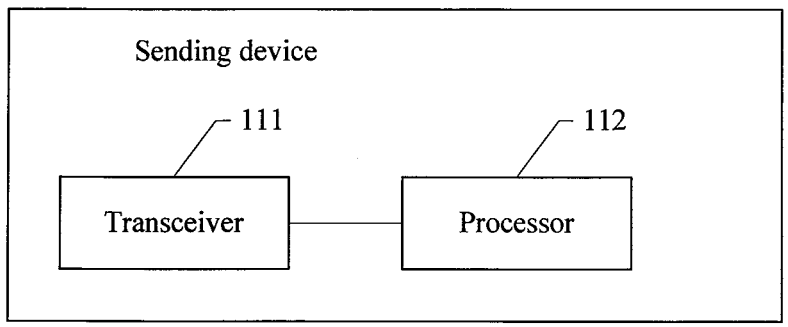
FIG. 11 is a schematic structural diagram of a sending device according to Method Embodiment 11 of the present invention.

This embodiment of the present invention provides a sending device currently located in a same wireless network as that of a receiving device. As shown in FIG. 11, the sending device includes a transceiver 111 and a processor 112.

The transceiver 111 is configured to: when a media data encoding mode of the sending device is set to non-compression, send media data that is not compressed to the receiving device; or when a media data encoding mode of the sending device is set to compression, send media data that is compressed to the receiving device.

The processor 112 is configured to acquire a frequency band of the wireless network; determine whether the frequency band of the wireless network is a set frequency band; and if yes, set the media data encoding mode of the sending device to non-compression; or if the frequency band of the wireless network is not the set frequency band, set the media data encoding mode of the sending device to compression.

By using a sending device provided by this embodiment of the present invention, the sending device acquires a frequency band of a wireless network; the sending device determines whether the frequency band of the wireless network is a set frequency band, and if the frequency band of the wireless network is the set frequency band, sets a media data encoding mode of the sending device to non-compression; and the sending device sends media data that is not compressed to a receiving device. Because a transmission rate of the wireless network of the set frequency band is very high, the sending device directly sends data that is not compressed to the receiving device, which reduces a delay caused by compression, reduces resources consumed by the sending device for data compression, and also reduces resources consumed by the receiving device for decompression.

Optionally, the transceiver is further configured to use one of wireless networks of multiple available frequency bands to perform media data transmission;

the processor is further configured to: before acquiring the frequency band of the wireless network, acquire information about transmission mode switching, and determine, according to the information about transmission mode switching, whether to switch the wireless network; and if a determining result is to switch the wireless network for transmission, switch the wireless network for performing data transmission, to a wireless network of another frequency band in the multiple available frequency bands; and the acquiring a frequency band of the wireless network is specifically: acquiring, by the sending device, the frequency band of the wireless network that is obtained after the switching.

The transceiver is further configured to send a notification message to the receiving device when the processor determines that the frequency band of the wireless network is the set frequency band; or the processor is further configured to add, when it is determined that the frequency band of the wireless network is the set frequency band, a notification identifier to the media data that is not compressed, where the notification message or the notification identifier is used to notify the receiving device that the media data encoding mode of the sending device is set to non-compression.

Optionally, the set frequency band is 5 GHz or 60 GHz.

Optionally, the sending media data that is not compressed to the receiving device specifically includes: sending the media data that is not compressed to the receiving device by using the Real-Time Transport Protocol.

A sending device described in this embodiment of the present invention may be the sending device described in the foregoing method embodiments 1, 3, and 4 to 8, and is not described repeatedly herein.

Embodiment 12

Figure 12:
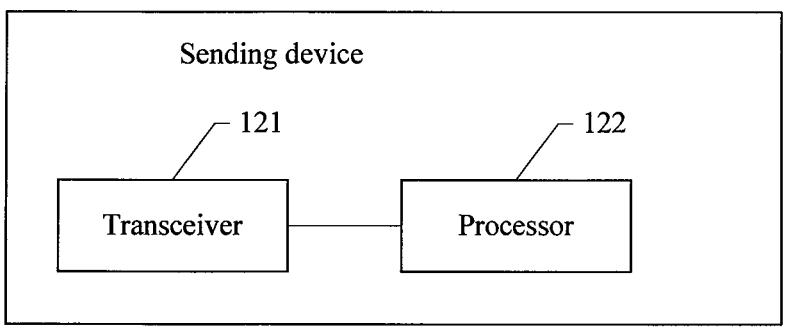
FIG. 12 is a schematic structural diagram of a sending device according to Method Embodiment 12 of the present invention.

This embodiment of the present invention provides a sending device. As shown in FIG. 12, the sending device includes a transceiver 121 and a processor 122.

The transceiver 121 is configured to: perform data transmission by using one of multiple available frequency bands; and transmit, to a receiving device according to a determining result, data that is compressed and that is to be subsequently transmitted or data that is not compressed and that is to be subsequently transmitted.

The processor 122 is configured to: acquire information about transmission mode switching; determine, according to the acquired information, whether to switch the frequency band for transmission; and when the acquired information meets a requirement for switching the frequency band for transmission, switch the frequency band for performing data transmission, to another one of the multiple available frequency bands, and determine, according to the frequency band obtained after the switching, whether to compress data that is to be subsequently transmitted.

By using a sending device provided by this embodiment of the present invention, data transmission is performed by using one of multiple available frequency bands; when acquired information meets a requirement for switching the frequency band for transmission, the frequency band for performing data transmission is switched to another one of the multiple available frequency bands; and whether to compress data that is to be subsequently transmitted is determined according to the frequency band after the switching, which reduces resources consumed by a receiving device for decompression, so that media data transmission efficiency is higher.

Optionally, the determining, according to the frequency band obtained after the switching, whether to compress data to be transmitted, includes: if a center frequency of the frequency band that is obtained after the switching is lower than a center frequency of the frequency band that is obtained before the switching, determining to compress the data to be subsequently transmitted; or if a center frequency of the frequency band that is obtained after the switching is higher than a center frequency of the frequency band that is obtained before the switching, determining not to compress the data that is to be subsequently transmitted.

Optionally, the transceiver is specifically configured to transmit, to the receiving device by using the Real-Time Transport Protocol, the data that is not compressed and that is to be subsequently transmitted.

Optionally, the transceiver is further configured to send a notification message to the receiving device when the processor determines that a frequency band of the wireless network is a set frequency band; or the processor is further configured to add, when it is determined that a frequency band of the wireless network is a set frequency band, a notification identifier to the data that is not compressed and that is to be subsequently transmitted, where the notification message or the notification identifier is used to notify the receiving device that a data encoding mode of the sending device is set to non-compression.

Embodiment 13

Figure 13:
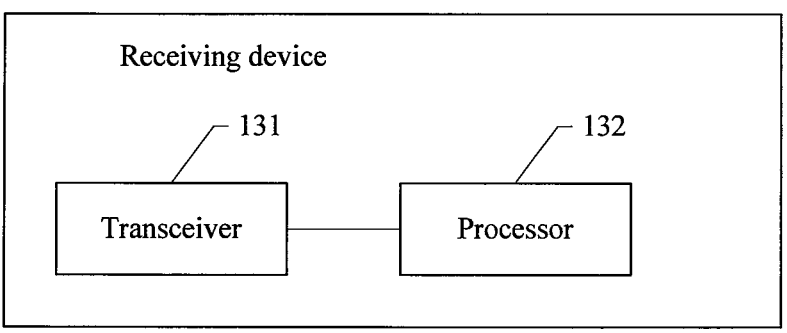
FIG. 13 is a schematic structural diagram of a receiving device according to Method Embodiment 13 of the present invention.

This embodiment of the present invention provides a receiving device. As shown in FIG. 13, the receiving device includes a transceiver 131 and a processor 132.

The transceiver 131 is configured to receive media data sent by a sending device.

The processor 132 is configured to determine an encoding mode of the media data, and if the encoding mode of the media data is non-compression, directly decode the media data.

By using a receiving device provided by this embodiment of the present invention, the receiving device determines an encoding mode of the media data, and if the encoding mode of the media data is non-compression, directly decodes the media data, which reduces resources consumed by the receiving device for decompression, so that media data transmission efficiency is higher.

Optionally, the determining, by the processor, an encoding mode of the media data, specifically includes:

reading a notification identifier in the media data, and determining the encoding mode of the media data according to the notification identifier; or reading a notification message sent by the sending device, and determining the encoding mode of the media data according to the notification message.

A receiving device described in this embodiment of the present invention may be the sending device described in the foregoing method embodiments 2 to 8, and is not described repeatedly herein.

A person of ordinary skill in the art may understand that all or some of the steps of the methods in the embodiments may be implemented by a program instructing related hardware. The program may be stored in a computer readable storage medium. The storage medium may include: a ROM, a RAM, a magnetic disk, or an optical disc.

A method and a device for transmitting media data that are provided by the embodiments of the present invention are described in detail above. In this specification, specific examples are used to describe the principle and implementation manners of the present invention, and the description of the embodiments is only intended to help understand the method and core idea of the present invention. In addition, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for transmitting media data, wherein a sending device sending the media data and a receiving device receiving the media data are currently located in a same wireless network, the method comprising:

using, by the sending device, one of wireless networks of multiple available frequency bands to perform media data transmission;

acquiring, by the sending device, information about transmission mode switching, and determining, according to the information about transmission mode switching, whether to switch the wireless network;

in response to determining, by the sending device, to switch the wireless network for transmission, switching the wireless network for performing data transmission to a wireless network of another frequency band in the multiple available frequency bands, and acquiring, by the sending device, the frequency band of the wireless network that is obtained after the switching; and determining, by the sending device, whether a center frequency of the frequency band of the wireless network after the switching is greater than a threshold, and when yes, setting a media data encoding mode of the sending device to non-compression, and sending, by the sending device, media data that is not compressed to the receiving device; or when the center frequency of the frequency band of the wireless network after the switching is not greater than the threshold, setting a media data encoding mode of the sending device to compression, and sending, by the sending device, media data that is compressed to the receiving device.

2. The method according to claim 1, wherein when the sending device determines that the center frequency of the frequency band of the wireless network after the switching is greater than the threshold, the method further comprises:

sending, by the sending device, a notification message, or adding a notification identifier to the media data that is not compressed, for notifying the receiving device that the media data encoding mode of the sending device is set to non-compression.

3. The method according to claim 1, wherein sending, by the sending device, media data that is not compressed to the receiving device comprises:

sending, by the sending device, the media data that is not compressed to the receiving device by using the Real-Time Transport Protocol.

4. A method for transmitting data by an electronic device, the method comprising:

performing data transmission by using one of multiple available frequency bands;

acquiring information about transmission mode switching;

determining, according to the acquired information, whether to switch the frequency band for transmission;

when the acquired information meets a requirement for switching the frequency band for transmission, switching the frequency band for performing data transmission, to another one of the multiple available frequency bands;

determining, according to the frequency band obtained after the switching, whether to compress data to be subsequently transmitted, comprising:

when a center frequency of the frequency band that is obtained after the switching is lower than a center frequency of the frequency band that is obtained before the switching, determining to compress the data to be subsequently transmitted; or when a center frequency of the frequency band that is obtained after the switching is higher than a center frequency of the frequency band that is obtained before the switching, determining not to compress the data that is to be subsequently transmitted; and transmitting, to a receiving device according to a determining result, data that is compressed and that is to be subsequently transmitted or data that is not compressed and that is to be subsequently transmitted.

5. The method according to claim 4, wherein transmitting, to the receiving device, data that is not compressed and that is to be subsequently transmitted comprises:

transmitting, to the receiving device by using the Real-Time Transport Protocol, the data that is not compressed and that is to be subsequently transmitted.

6. The method according to claim 4, wherein when it is determined not to compress the data to be subsequently transmitted, the method further comprises:

sending, by a sending device, a notification message to the receiving device, or adding, by a sending device, a notification identifier to the data that is not compressed and that is to be subsequently transmitted, for notifying the receiving device that a data encoding mode of the sending device is set to non-compression.

7. A sending device disposed within a same wireless network as that of a receiving device, the sending device comprising:

a transceiver configured to:
when a media data encoding mode of the sending device is set to non-compression, send media data that is not compressed to the receiving device; or
when a media data encoding mode of the sending device is set to compression, send media data that is compressed to the receiving device; and a processor configured to:
acquire a frequency band of the wireless network;
determine whether a center frequency of the frequency band of the wireless network is greater than a threshold, and when yes, set the media data encoding mode of the sending device to non-compression; or
when the center frequency of the frequency band of the wireless network is not greater than the threshold, set the media data encoding mode of the sending device to compression.

8. The sending device according to claim 7, wherein:
the transceiver is further configured to use one of wireless networks of multiple available frequency bands to perform media data transmission; and
the processor is further configured to:
before acquiring the frequency band of the wireless network, acquire information about transmission mode switching, and determine, according to the information about transmission mode switching, whether to switch the wireless network,
when a determining result is to switch the wireless network for transmission, switch the wireless network for performing data transmission, to a wireless network of another frequency band in the multiple available frequency bands, and
acquire, by the sending device, the frequency band of the wireless network that is obtained after the switching.

9. The sending device according to claim 7, wherein:
the transceiver is further configured to send a notification message to the receiving device when the processor determines that the frequency band of the wireless network is the set frequency band; or
the processor is further configured to add, when it is determined that the frequency band of the wireless network is the set frequency band, a notification identifier to the media data that is not compressed, wherein the notification message or the notification identifier is used to notify the receiving device that the media data encoding mode of the sending device is set to non-compression.

10. The sending device according to claim 7, wherein the transceiver is further configured to:
end the media data that is not compressed to the receiving device by using the Real-Time Transport Protocol.

11. A sending device, comprising:
a transceiver configured to:
perform data transmission by using one of multiple available frequency bands; and
transmit, to a receiving device according to a determining result, data that is compressed and that is to be subsequently transmitted or data that is not compressed and that is to be subsequently transmitted; and
a processor configured to:
acquire information about transmission mode switching;
determine, according to the acquired information, whether to switch the frequency band for transmission; and
when the acquired information meets a requirement for switching the frequency band for transmission, switch the frequency band for performing data transmission, to another one of the multiple available frequency bands, and determine, according to the frequency band obtained after the switching, whether to compress data that is to be subsequently transmitted.

12. The sending device according to claim 11, wherein the processor is further configured to:
when a center frequency of the frequency band that is obtained after the switching is lower than a center frequency of the frequency band that is obtained before the switching, determine to compress the data to be subsequently transmitted; or
when a center frequency of the frequency band that is obtained after the switching is higher than a center frequency of the frequency band that is obtained before the switching, determine not to compress the data that is to be subsequently transmitted; and
transmit, to the receiving device by using the Real-Time Transport Protocol, the data that is not compressed and that is to be subsequently transmitted.

13. The sending device according to claim 12, wherein:
the transceiver is further configured to send a notification message to the receiving device when the processor determines that a frequency band of the wireless network is a set frequency band; or
the processor is further configured to add, when it is determined that a frequency band of the wireless network is a set frequency band, a notification identifier to the data that is not compressed and that is to be subsequently transmitted, wherein the notification message or the notification identifier is used to notify the receiving device that a data encoding mode of the sending device is set to non-compression.

* * * * *